United States Patent
Kito et al.

(10) Patent No.: US 10,775,768 B2
(45) Date of Patent: Sep. 15, 2020

(54) MACHINE CONTROL PROGRAM CREATING DEVICE

(75) Inventors: Koji Kito, Toyota (JP); Terukazu Senda, Obu (JP); Hirohisa Okudaira, Toyokawa (JP)

(73) Assignee: JTEKT CORPORATION, Osaka-shi (JP)

( * ) Notice: Subject to any disclaimer, the term of this patent is extended or adjusted under 35 U.S.C. 154(b) by 690 days.

(21) Appl. No.: 13/526,017

(22) Filed: Jun. 18, 2012

(65) Prior Publication Data

US 2013/0006396 A1 Jan. 3, 2013

(30) Foreign Application Priority Data

Jun. 29, 2011 (JP) ................................ 2011-144524

(51) Int. Cl.
*G05B 19/409* (2006.01)
*G05B 19/4093* (2006.01)

(52) U.S. Cl.
CPC ....... *G05B 19/409* (2013.01); *G05B 19/4093* (2013.01); *G05B 2219/36088* (2013.01); *Y02P 90/265* (2015.11)

(58) Field of Classification Search
CPC .............. G05B 19/409; G05B 19/4093; G05B 2219/36088; Y02P 90/265
USPC ......................................................... 700/181
See application file for complete search history.

(56) References Cited

U.S. PATENT DOCUMENTS

| | | | | |
|---|---|---|---|---|
| 6,112,133 | A | * | 8/2000 | Fishman ....................... 700/182 |
| 7,810,069 | B2 | * | 10/2010 | Charisius .................. G06F 8/20 |
| | | | | 717/106 |
| 2005/0071802 | A1 | * | 3/2005 | Brakelmann ...... G05B 19/4069 |
| | | | | 717/100 |
| 2005/0262056 | A1 | * | 11/2005 | Hamzy ..................... G06F 8/36 |

(Continued)

FOREIGN PATENT DOCUMENTS

| | | |
|---|---|---|
| EP | 0 642 066 A1 | 3/1995 |
| JP | 2-56604 A | 2/1990 |
| JP | 2001-184198 A | 7/2001 |

(Continued)

OTHER PUBLICATIONS

The Extended European Search Report dated Nov. 7, 2012, in Application No. / Patent No. 12173518.7-2206.

(Continued)

*Primary Examiner* — Michael D Masinick
(74) *Attorney, Agent, or Firm* — Oblon, McClelland, Maier & Neustadt, L.L.P.

(57) ABSTRACT

A program includes a parameter numeric value and a parameter code and a parameter name that are associated with the parameter numeric value. A dialog box information creation processing unit recognizes the parameter code and the parameter name, which are included in the program, as a parameter item, and creates dialog box information from the recognized parameter code and parameter name and the associated parameter numeric value. The parameter numeric value within the created dialog box information is editable on a dialog box display screen. When the parameter numeric value is updated, a process of changing the corresponding parameter numeric value in the program to the updated parameter numeric value is executed.

20 Claims, 14 Drawing Sheets

(56) References Cited

U.S. PATENT DOCUMENTS

2008/0201002 A1    8/2008    Crew et al.
2010/0114359 A1    5/2010    Kommareddy et al.

FOREIGN PATENT DOCUMENTS

| JP | 2002-132313 A | 5/2002 |
|----|---------------|--------|
| JP | 2003-186511   | 7/2003 |
| JP | 2009-160636 A | 7/2009 |
| JP | 2011-11139 A  | 1/2011 |

OTHER PUBLICATIONS

Notification of Reason(s) for Refusal dated Mar. 3, 2015 in Japanese Patent Application No. 2011-144524 (submitting English translation only).

\* cited by examiner

<BORING TEMPLATE>

```
[(*$TEMP_GRP*BORING *);]
[(*$TEMP_GRP_TXT*BORING *);]
[(*$TEMP_CYC*NORMAL *);]
[(*$TEMP_CYC_TXT*NORMAL *);]
[IF 1=1(*$C301* JIG CHIP WASH *) THEN]
    [IF 1=1(*$C302*BED CHIP WASH*) THEN]
        M57M59
    [ELSE;]
        M57M66
    [ENDIF;]
[ELSE;]
    [IF 1=1(*$C302*) THEN]
        M58M59
    [ELSE;]
        M58M66
    [ENDIF;]
[ENDIF;]
[SI19010:=7901;]
M91
G90G54(*$C002*COORDINATE SYSTEM*)G00X0.(*$C110* HOLE X *)Y0.(*$C111*
HOLE Y *)M103S6000 (*$C003* SPINDLE SPEED*) F1200.(*$C004* FEEDRATE *)
G43Z0.(*$C112*INITIAL POINT Z*)H00(*$C000*TOOL NUMBER *)M03M156
[IF 1=1(*$C303*COOLANT 0/1*) THEN]
    [IF 1=1(*C304* SPINDLE THRU 0/1*) THEN]
        M08M50
    [ELSE;]
        M08
    [ENDIF;]
[ELSE;]
    [IF 1=1(*$C302*) THEN]
        M50
    [ELSE;]

[ENDIF;]
[ENDIF;]

G00Z0.(*$C113*R POINT Z*)
G01Z0.(*$C114* HOLE DEPTH Z*)G09
G00Z0.(*$C113*)

(*SECOND BORING *)

PROCESS CHART

| No. | PROCESS NAME | PROCESS INFORMATION |
|---|---|---|
| 1 | MOUNTING FACE ROUGH CUTTING (φ••) | •••••••• |
| 2 | COMMUNICATION HOLE BORING | •••••••• |
| 3 | •••••••• | •••••••• |
| 4 | •••••••• | •••••••• |
| 5 | •••••••• | •••••••• |
| 6 | •••••••• | •••••••• |
| 7 | •••••••• | •••••••• |
| ⋮ | | |

Fig. 10

MACHINE CONTROL PROGRAM CREATING DEVICE

INCORPORATION BY REFERENCE/RELATED APPLICATION

This application claims priority to Japanese Patent Application No. 2011-144524 filed on Jun. 29, 2011 the disclosure of which, including the specification, drawings and abstract, is incorporated herein by reference in its entirety.

BACKGROUND OF THE INVENTION

1. Field of the Invention

The invention relates to a device that creates a machining program for controlling a machine tool, a machining robot, or the like.

2. Discussion of Background

A machining program for controlling a machine tool, a machining robot, or the like, includes, for example, not only special codes, such as G codes and M codes, but also a large number of numeric values that are, for example, operation values such as command coordinate values and a spindle rotational speed. In order to create a machining program, it is necessary to accurately understand the meanings of special codes and numeric values. Therefore, conventionally, only an expert is able to create a machining program. Then, researches have been conducted to make it possible to easily create a machining program. For example, Japanese Patent Application Publication No. 2003-186511 (JP 2003-186511 A) describes that guidance is displayed as a support for creation of a NC program to thereby facilitate creation of the NC program.

After a machining program is once created, the numeric values in the machining program may be edited due to a design change, or the like. In such a case, all the corresponding numeric values in the machining program need to be edited. However, when there are multiple portions to be edited, an edit error may occur unless the contents of the machining program are understood.

SUMMARY OF THE INVENTION

The invention provides a machine control program creating device that is able to easily create or edit a machine control program.

According to a feature of an example of the invention, contents of a dialog box display screen correspond to a parameter numeric value and a parameter name that are described in a machine control program. That is, by describing the parameter code and the parameter name in the machine control program, the parameter name is set as an item of the dialog box display screen. Thus, the numeric value described in the machine control program is freely parameterized. Furthermore, parameterizing means just simply needs to describe a parameter numeric value, a parameter code and a parameter name in the machine control program. Thus, parameterization is significantly easy. Because the numeric value is freely parameterized in this way, a numeric value that needs to be described multiple times in the machine control program is easily parameterized, so work for editing a parameter numeric value is also easy. As a result, it is possible to reduce erroneous input or erroneous setting of a numeric value in the machine control program. Particularly, for example, when some of numeric values are changed due to a design change, a period of time required to change the machine control program is reduced.

Furthermore, when a machine control program is once created, the machine control program is edited without understanding of a special G code, or the like.

According to another feature of an example of the invention, the parameter name is editable on the dialog box display screen.

According to a further feature of an example of the invention, by creating a machine control program from a template, the machine control program is standardized.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 7 is a template stored in a template storage unit shown in FIG. 8;

FIG. 10 is a process chart input through a process chart input unit shown in FIG. 8;

DETAILED DESCRIPTION OF EMBODIMENTS

Hereinafter, embodiments of the invention will be described with reference to the accompanying drawings. Here, a NC program used for a machine tool or a machining robot is taken as an example of a machine control program to be created. Particularly, in the following description, a horizontal machining center is taken as an example from among various machine tools. However, of course, not only machine tools other than machining centers but also serial-link or parallel-link machining robots and positioning robots, such as measuring devices, are applicable.

Figure 1:
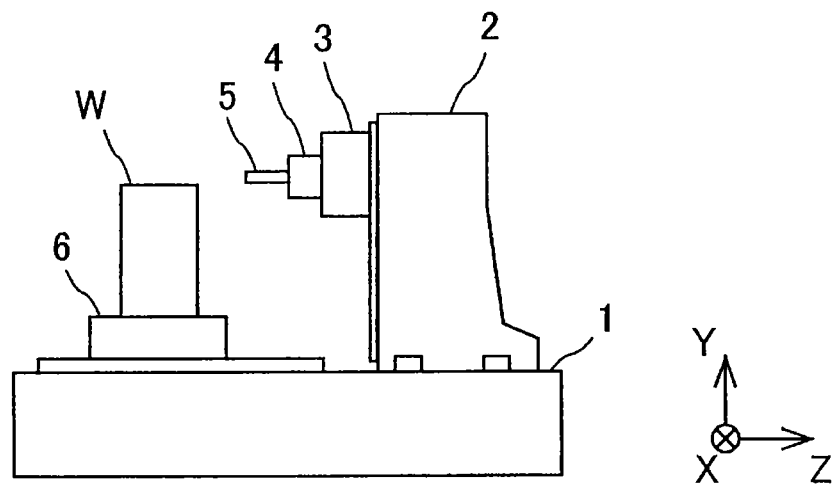
FIG. 1 is a configuration diagram of a machine tool.

First, the configuration of a target machine will be described. A horizontal machining center that is a machine tool which is a target to be controlled by a NC program will be described with reference to FIG. 1. As shown in FIG. 1, the machine tool includes a bed 1, a column 2, a saddle 3, a rotary spindle 4 and a table 6. The column 2 is movable in an X-axis direction on the bed 1. The saddle 3 is movable in a Y-axis direction on the front face (left face in FIG. 1) of the column 2. The rotary spindle 4 that holds a tool 5 rotatably is supported by the saddle 3. The table 6 is movable in a Z-axis direction on the bed 1, and a workpiece W is placed on the table 6. Although not shown in the drawing, the machine tool includes a motor, a coolant nozzle, a coolant pump, and the like. The motor is used to move the column 2, the saddle 3 and the table 6. The coolant nozzle and the coolant pump are used to supply coolant.

Figure 2:
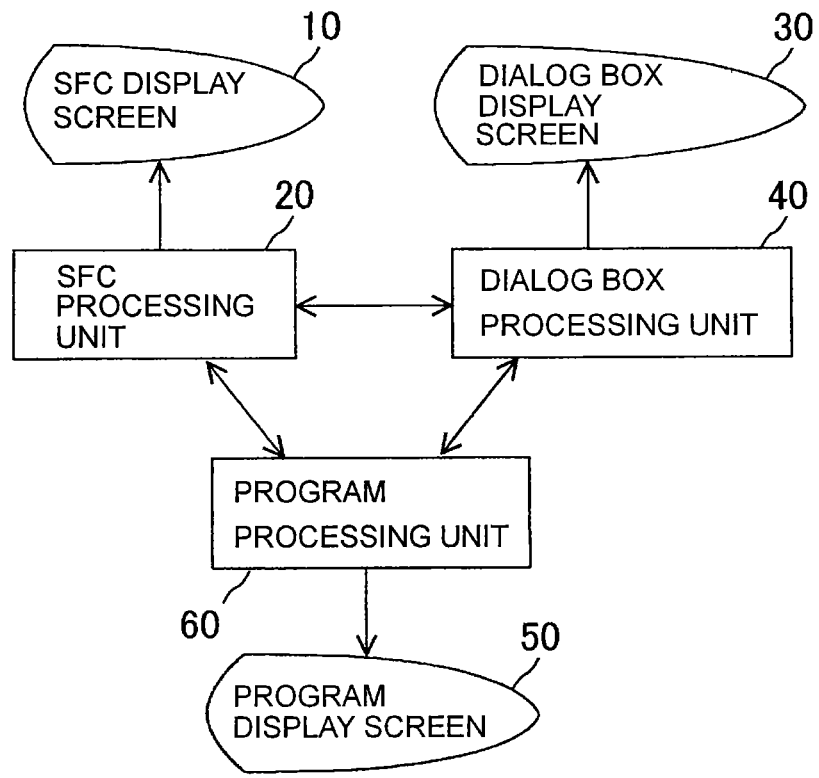
FIG. 2 is a functional block schematic diagram of a program creating device for creating a NC program for the machine tool shown in FIG. 1.
Figure 3:
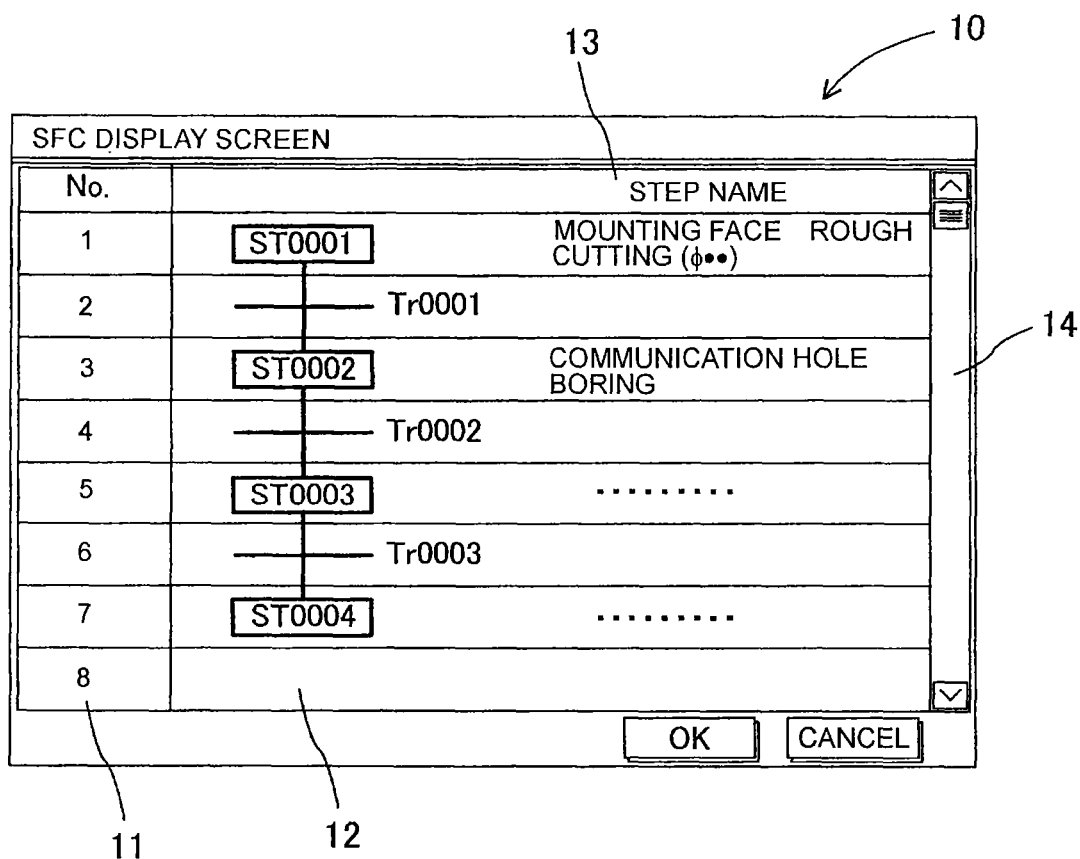
FIG. 3 shows the contents of a sequential function chart (SFC) display screen shown in FIG. 2.

Next, the schematic configuration of a program creating device will be described. The program creating device that creates a NC program for controlling the above-described machine tool will be described with reference to the functional block diagram in FIG. 2. FIG. 2 shows the schematic configuration of the program creating device. In addition, FIG. 3 shows a SFC (sequential function chart) display screen 10 that constitutes the program creating device, FIG. 4 and FIG. 5 respectively show dialog box display screens 31 and 32, and FIG. 6 shows a program display screen 50. In addition, FIG. 7 that shows a template is also referenced.

As shown in FIG. 2, the program creating device includes the SFC display screen 10, a SFC processing unit 20, the dialog box display screens 31 and 32, a dialog box processing unit 40, the program display screen 50 and a program processing unit 60.

As shown in FIG. 3, the SFC display screen 10 displays the NC program as a sequential function chart (SFC). The SFC processing unit 20 executes a process of recognizing the NC program as a SFC and then displaying the SFC on the SFC display screen 10. Here, a SFC is generally used in a programmable logic controller (PLC), or the like. However, the SFC in the present embodiment differs from a SFC used in a PLC, or the like, and is used for the NC program. Here, the NC program is configured to sequentially execute a plurality of operations. For example, when facing is performed, subsequently tool replacement is performed, boring is performed and then boring is performed at another portion, the NC program is created in accordance with this sequence. Then, operations that may be combined together are associated as a step ST of the SFC to recognize the NC program as the SFC. That is, when the NC program is divided into a plurality of operation cycles (including machining cycles and non-machining cycles), the SFC processing unit 20 stores steps ST corresponding to the respective operation cycles and causes the SFC display screen 10 to display the NC program as the SFC.

Figure 4:
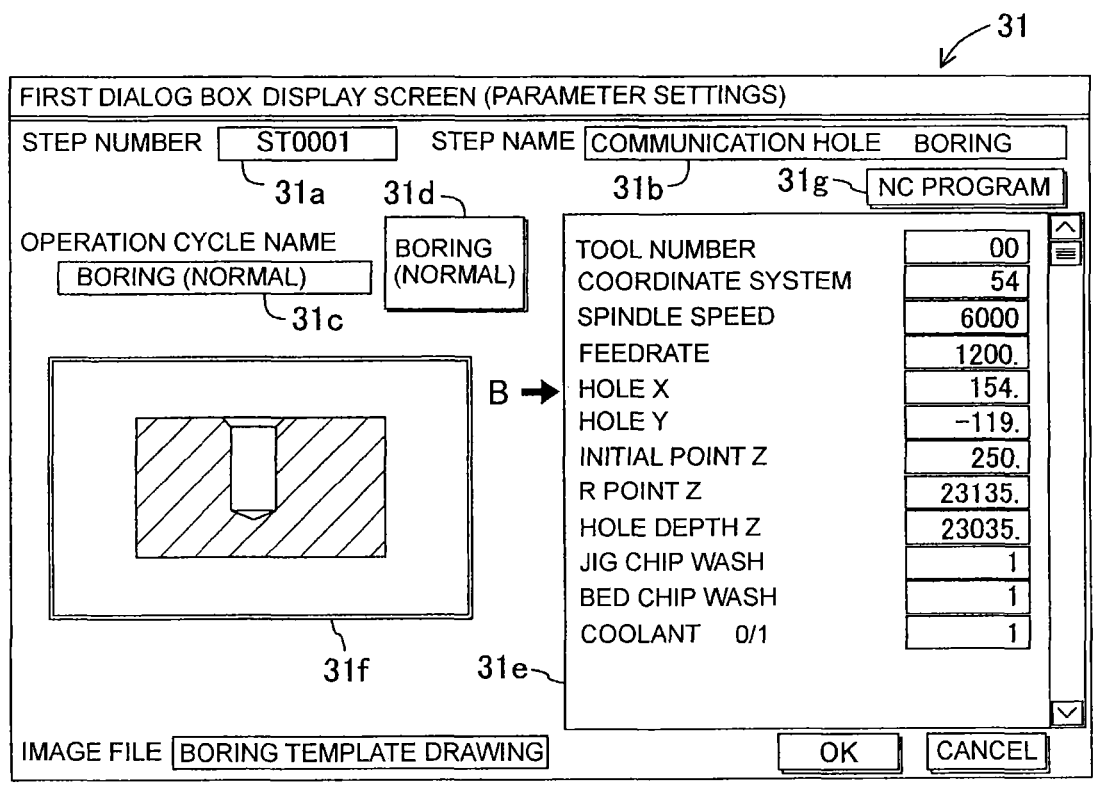
FIG. 4 is a first dialog box display screen shown in FIG. 2.
Figure 5:
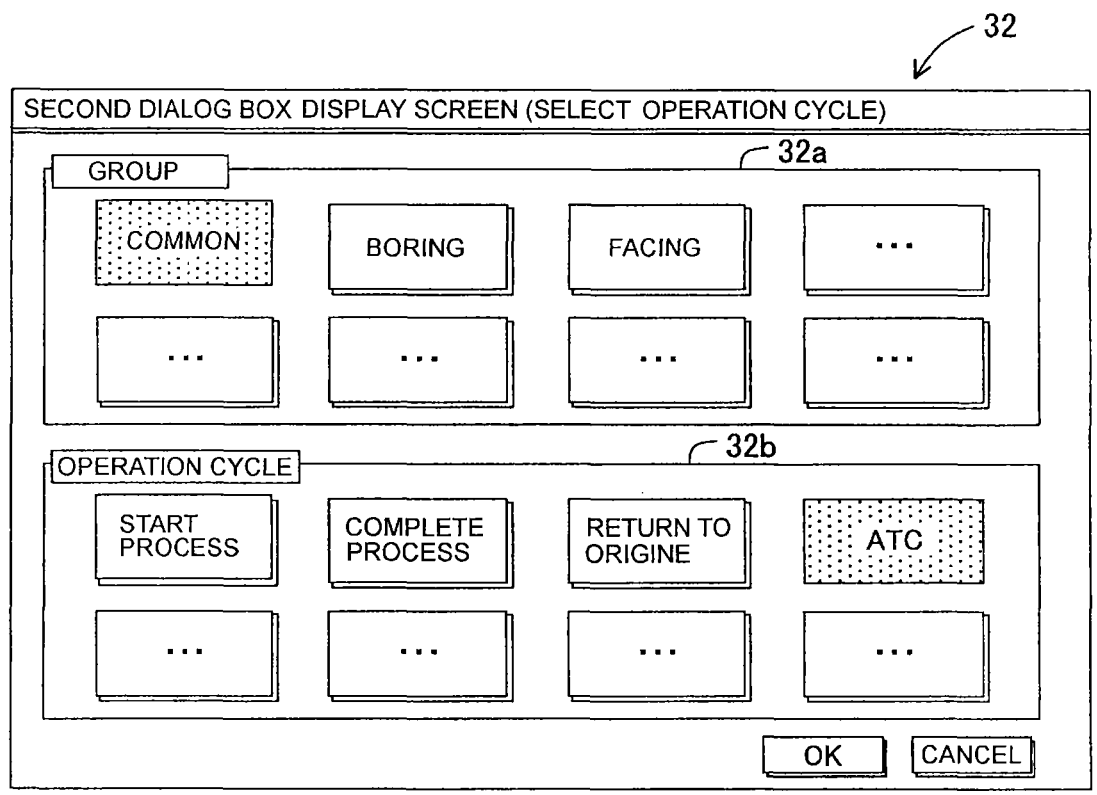
FIG. 5 is a second dialog box display screen shown in FIG. 2.
Figure 6:
FIG. 6 shows the contents of a program display screen shown in FIG. 2.

FIG. 4 and FIG. 5 respectively show the dialog box display screens 31 and 32. The dialog box processing unit 40 executes display processing for the dialog box display screens 31 and 32. The dialog box processing unit 40 stores dialog box information for each step ST of the SFC stored in the SFC processing unit 20, and causes the first dialog box display screen 31 to display one of the pieces of dialog box information as shown in FIG. 4. The first dialog box display screen 31 displays parameter information (parameter names and parameter numeric values) regarding a portion of the NC program, corresponding to the step ST. Then, on the first dialog box display screen 31, the worker is allowed to edit not only the parameter numeric values but also the parameter names.

Furthermore, when the dialog box processing unit 40 creates new dialog box information corresponding to a step ST of the SFC, the dialog box processing unit 40 is able to select an intended template from among templates created in advance respectively for the types of operation cycles, and creates dialog box information on the basis of the selected template. FIG. 5 shows the second dialog box display screen 32 at the time when a template is selected. In addition, FIG. 7 shows a template. Here, as shown in FIG. 7, because parameter numeric values included in the template are set at initial values, the parameter numeric values included in the dialog box information obtained from the template are also initial values. Therefore, the worker is required to edit the parameter numeric values on the first dialog box display screen 31.

FIG. 6 shows the program display screen 50. The program processing unit 60 executes display processing for the program display screen 50. The program processing unit 60 creates the NC program on the basis of the SFC created by the SFC processing unit 20 and the pieces of dialog box information created by the dialog box processing unit 40. Furthermore, the program processing unit 60 executes a process of displaying the created NC program on the program display screen 50. In FIG. 6, there is, for example, a portion described as "154(*$C110*Hole X*)" (arrow A). In this description, "154" indicates the parameter numeric value, "C110" indicates the parameter code, and "Hole X" indicates the parameter name. Here, in the right box section shown in FIG. 4, the portion described as "Hole X 154" corresponds to the above portion of the NC program (arrow B). In this way, the NC program is described by associating the parameter numeric values, the parameter names and the parameter codes with one another. Then, the parameter numeric values and parameter names in the NC program are associated with corresponding pieces of dialog box information.

In addition, on the program display screen 50 shown in FIG. 6, the worker is allowed to directly edit the NC program. In this case, on the basis of the edited NC program, the SFC information stored in the SFC processing unit 20 is changed, and the dialog box information stored in the dialog box processing unit 40 is changed.

In this way, the program creating device enables the NC program to be displayed as the SFC, and displays the corresponding piece of dialog box information associated with each step ST of the SFC on the dialog box display screen. Then, on the dialog box display screen, the parameter numeric values included in the NC program may be edited. Furthermore, on the dialog box display screen, the parameter names are displayed in association with the NC program, and the parameter names are also editable. Conversely, when the parameter names in the NC program are edited, the parameter names of the dialog box display screen are changed. Then, the templates of the NC program described such that parameters are recognizable are prepared in advance. Particularly, the prepared templates should be associated with the respective steps ST of the SFC. In this way, the program creating device forms the NC program into the SFC and makes it possible to easily create or edit the contents of steps ST of the SFC. Furthermore, the program creating device makes it possible to freely parameterize the numeric values in the NC program.

Next, the detailed configuration of the program creating device will be described with reference to the functional block diagram of FIG. 8. In addition, the operations of the processing units that constitute the program creating device will be described with reference to the flowcharts shown in FIG. 9 and FIG. 11 to FIG. 13. In addition, FIG. 10 is referenced for a process chart input through a process chart input unit 21 that constitutes the SFC processing unit 20. Furthermore, FIG. 2 to FIG. 6 are respectively referenced as needed for the display screens 10, 31, 32 and 50 that constitute the program creating device, and FIG. 7 that shows a template is also referenced.

As described above with reference to FIG. 2, the program creating device includes the SFC display screen 10, the SFC processing unit 20, the dialog box display screens 31 and 32, the dialog box processing unit 40, the program display screen 50, the program processing unit 60 and an external input unit 70. Here, FIG. 8 shows functional blocks into which the SFC processing unit 20, the dialog box processing unit 40 and the program processing unit 60 are segmented in more details.

The SFC will be described below. As shown in FIG. 3, the SFC display screen 10 has a symbol number field 11, a symbol display field 12 and a step name field 13. The symbol number field 11 shows a line number. The symbol display field 12 shows a symbol of the SFC for each symbol number. The symbols of the SFC include a step ST indicated by a rectangular frame shape, a transition Tr, a jump, or the like. In FIG. 3, steps ST0001 to ST0004 are respectively shown at the first line, the third line, the fifth line and the seventh line, and transitions Tr0001 to Tr0003 are respectively shown at the second line, the fourth line and the sixth line. The step name field 13 shows a step name for each step ST when the symbol of the symbol display field 12 is a step ST. In FIG. 3, the step name of step ST0001 is shown as "mounting face rough cutting (ϕ●●)". The step name is, for example, a string that illustrates what is done in a step ST of the SFC (operation cycle) by describing a work portion in the step ST, a work type, such as boring, facing, rough machining and finishing, a tool diameter, and the like. In addition, the SFC display screen 10 displays an up-down scroll bar 14 at the right end, and allows up-down scroll.

Figure 8:
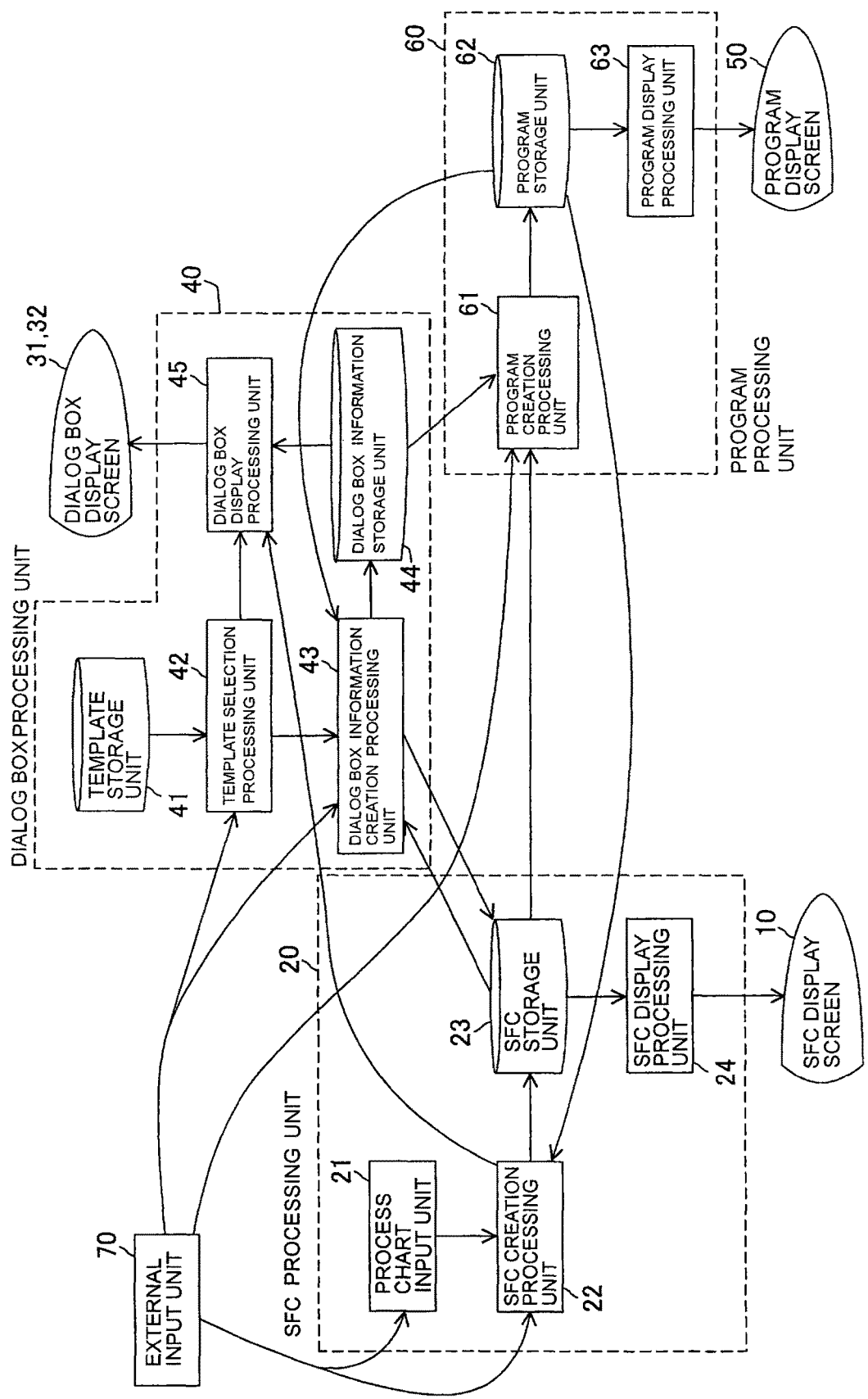
FIG. 8 is a detailed functional block diagram of the program creating device shown in FIG. 2.

As shown in FIG. 8, the SFC processing unit 20 includes the process chart input unit 21, a SFC creation processing unit 22, a SFC storage unit 23 and a SFC display processing unit 24. The process chart input unit 21 receives (acquires) a process chart that shows the control steps for the machine tool. The worker operates the external input unit 70, such as a keyboard and a pointing device, to input the data of the process chart in the process chart input unit 21. The process chart shows the sequence of a plurality of processes, and is, for example, tabular data shown in FIG. 10. The process chart shown in FIG. 10 includes a process sequence, a process name and process information. The process name is a name used as a step name of the above-described SFC. For example, mounting face rough cutting (ϕ●●), and the like, are shown. In addition, the process information includes, for example, tool information, such as a type of tool used, a tool diameter and a tool length, and machining conditions, such as a spindle rotational speed, a machining feed speed and an infeed.

When the NC program is divided into a plurality of operation cycles, the SFC creation processing unit 22 creates the respective operation cycles as steps ST of the SFC. Furthermore, the SFC creation processing unit 22 is able to create a SFC in which transitions Tr are interposed between the steps ST or is able to create a SFC in which steps ST are directly connected to each other without interposing transitions Tr between the steps ST. The SFC display screen of FIG. 3 shows the case where transitions Tr are interposed between all the steps ST.

Furthermore, the SFC is associated with the NC program stored in a program storage unit 62 (described later). For example, in the NC program shown in FIG. 6, a portion from a step start code "(*$CYC0001*Normal*)" (second line from the above) to a step end code "(*$CYCEND*)" (bottom line) is one step ST of the SFC. That is, the SFC creation processing unit 22 creates steps ST of the SFC on the basis of the step start codes and step end codes of the NC program.

In addition, the SFC creation processing unit 22 is able to create a SFC as the worker directly inputs a symbol of a new step ST with the use of the external input unit 70. Other than the above, the SFC creation processing unit 22 automatically acquires a process chart (shown in FIG. 10) input through the process chart input unit 21 to create a SFC. In this case, the SFC creation processing unit 22 recognizes the process names that indicate the control steps in the process chart shown in FIG. 10 as operation cycles and creates a step ST of the SFC for each process. For example, when the SFC creation processing unit 22 automatically acquires the process chart shown in FIG. 10, the SFC is as shown in FIG. 3. In this case, the SFC creation processing unit 22 recognizes the process names in the process chart shown in FIG. 10 as the step names in FIG. 3.

The SFC storage unit 23 stores the SFC created by the SFC creation processing unit 22. The SFC stored in the SFC storage unit 23 is such information shown in FIG. 3. That is, the SFC storage unit 23 stores a symbol type and symbol code corresponding to a symbol number, that is, the sequence of symbols, and a step name corresponding to each step ST.

The SFC display processing unit 24 executes a process of displaying the SFC and step names stored in the SFC storage unit 23 on the SFC display screen 10. Thus, when the SFC stored in the SFC storage unit 23 is changed, the contents displayed on the SFC display screen 10 are also changed accordingly.

Figure 9:
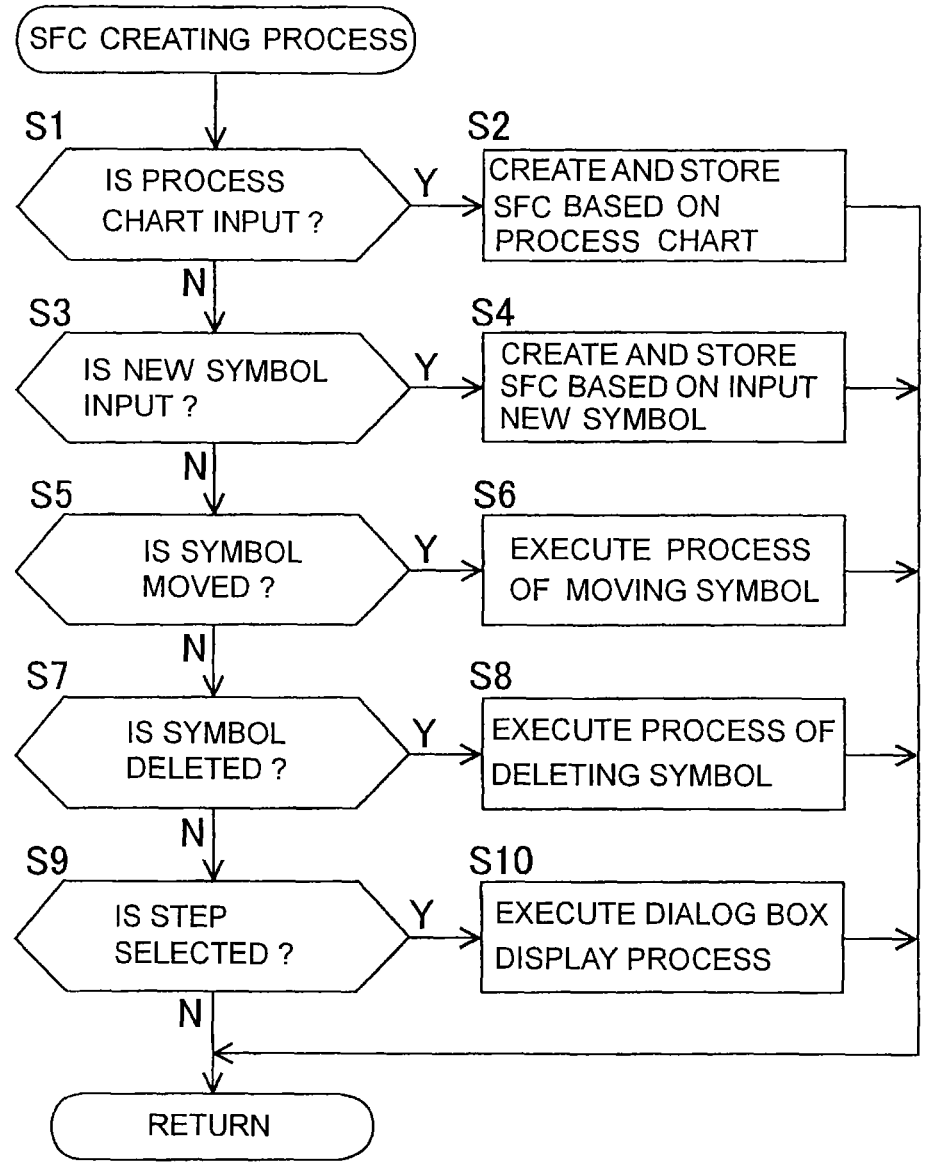
FIG. 9 is a flowchart of a process executed by a SFC creation processing unit shown in FIG. 8.

Here, the process executed by the above-described SFC creation processing unit 22 will be described with reference to FIG. 9. As shown in FIG. 9, the SFC creation processing unit 22 determines whether a process chart is input by the worker (S1). When a process chart is input, the SFC creation processing unit 22 creates a SFC based on the process chart, and stores the SFC in the SFC storage unit 23 (S2). When a process chart is not input, subsequently it is determined whether a new symbol is input by the worker (S3). When a new symbol is input, a SFC is created on the basis of the input symbol (S4).

Subsequently, when a new symbol is not input, it is determined whether the created symbols are moved by the worker (S5). When the symbols are moved, a process of moving the symbols, that is, a SFC based on the sequence of the moved symbols is stored in the SFC storage unit 23 (S6). Subsequently, when the process of moving the symbols is not executed, it is determined whether some of the created symbols are deleted by the worker (S7). When some of the symbols are deleted, a SFC in which the some of the symbols are deleted and the sequence of the remaining symbols is changed is stored in the SFC storage unit 23 (S8).

Subsequently, when no symbol is deleted, it is determined whether one of the created steps ST is selected by the worker (S9), and, when one of the created steps ST is selected, a dialog box display processing unit 45 (described later) is instructed to display the dialog box information associated with the selected step ST on the first dialog box display screen 31 (S10). Then, after the process of S2, S4, S6, S8 or S10 or in the case of negative determination in S9, the process is returned.

The dialog box will be described below. The first dialog box display screen 31 is an input screen on which parameter numeric values and parameter names in the NC program can be set and edited. As shown in FIG. 4, the first dialog box display screen 31 has a display area 31a for a step number of the SFC, a display area 31b for a step name, a display area 31c for an operation cycle name, a display area 31d for an operation cycle selection button, a display area 31e for parameters, a display area 31f for a drawing and a NC program display button 31g. The first dialog box display screen 31 shows dialog box information included in the step ST selected by the SFC creation processing unit 22.

Here, the dialog box information includes information regarding the above-described areas. Information displayed in the display area for parameters includes parameter names and parameter numeric values. However, the dialog box information includes parameter codes in addition to the parameter numeric values and the parameter names. Note that no parameter code is displayed in the display area for parameters on the first dialog box display screen 31 but parameter codes may be displayed instead.

FIG. 4 shows an example in which the dialog box information of step ST0001 of the SFC of FIG. 3 is displayed. In FIG. 4, the step number in the display area 31a and the step name in the display area 31b respectively correspond to the step ST selected by the SFC creation processing unit 22 and the step name of the selected step ST. The operation cycle name displayed in the display area 31c is the name recorded in a plurality of templates (described later).

The operation cycle selection button in the display area 31d is in synchronization with a template selection processing unit 42 (described later), and is used to select the template (shown in FIG. 7) of the type of the operation cycle in that step ST. That is, when the operation cycle selection button is selected, the template selection processing unit 42 executes a process of displaying the second dialog box display screen 32.

As described above, the parameters in the display area 31e are parameter numeric values and parameter names included in the NC program (shown in FIG. 6). The drawing in the display area 31f shows a work type (operation type), and shows a template drawing prestored in a template storage unit 41 (described later) here. The template drawing is a drawing associated with the template selected by the template selection processing unit 42. Here, the drawing in the display area 31f may be a drawing of a workpiece W, prepared by the worker separately. For example, when the drawing including dimensions is displayed in the display area 31f, the drawing may be referenced at the time of input of parameter numeric values. The NC program display button 31g is used when the NC program display screen 50 shown in FIG. 6 is displayed.

The second dialog box display screen 32 is used to select the template of an operation cycle when the worker operates the external input unit 70 to select the operation cycle selection button in the display area 31d on the first dialog box display screen 31. As shown in FIG. 5, the second dialog box display screen 32 has a group area 32a and an operation cycle area 32b. The group area 32a displays group names of a plurality of groups into which work types (operation types) are roughly classified. The operation cycle area 32b displays operation cycles included in each group. For example, in FIG. 5, the group area 32a displays common, boring, facing, and the like, and the operation cycle area 32b displays the common group and displays start process, complete process, return to origin, ATC (automatic tool change), and the like. That is, when an operation cycle is selected, one group is selected from the group area 32a on the second dialog box display screen 32 and then one operation cycle is selected from the operation cycle area 32b.

As shown in FIG. 8, the dialog box processing unit 40 includes the template storage unit 41, the template selection processing unit 42, a dialog box information creation processing unit 43, a dialog box information storage unit 44 and a dialog box display processing unit 45.

The template storage unit 41 stores the templates of the NC program, which respectively correspond to a plurality of operation types. For example, FIG. 7 shows the template of boring at one portion. Note that the "Normal" means machining one point, and is a term for distinguishing machining one point from machining multiple points. Then, in the template shown in FIG. 7, the portion described as "Numeric Value (*$Parameter Code*Parameter Name*)" is a description method by which the dialog box information creation processing unit 43 (described later) recognizes the numeric value as a parameter numeric value.

For example, the portion described as "6000 (*$C003*Spindle Rotational Speed*)" is a description for parameterizing the spindle rotational speed, and the spindle rotational speed is set to 6000 revolutions per minute in the template. In addition, the portion described as "1200 (*$C004*Feed Speed*)" is a description for parameterizing the feed speed, and the feed speed is set to 1200 meters per minute. Here, the spindle rotational speed and the feed speed are set to standard values in the template. However, the spindle rotational speed and the feed speed are parameterized, so these are editable on the first dialog box display screen 31. In addition, "Hole X", "Hole Depth (Coordinate) Z", and the like, are set to "0" in the template. However, "Hole X", "Hole Depth (Coordinate) Z", and the like, are parameterized, so these are editable on the first dialog box display screen 31.

The template selection processing unit 42 selects the template corresponding to the operation cycle of the currently creating step ST from among the plurality of templates stored in the template storage unit 41. The template selection processing unit 42 is selected on the second dialog box display screen 32 shown in FIG. 5 as the worker operates the external input unit 70. The process executed by the template selection processing unit 42 will be described with reference to FIG. 11.

Figure 11:
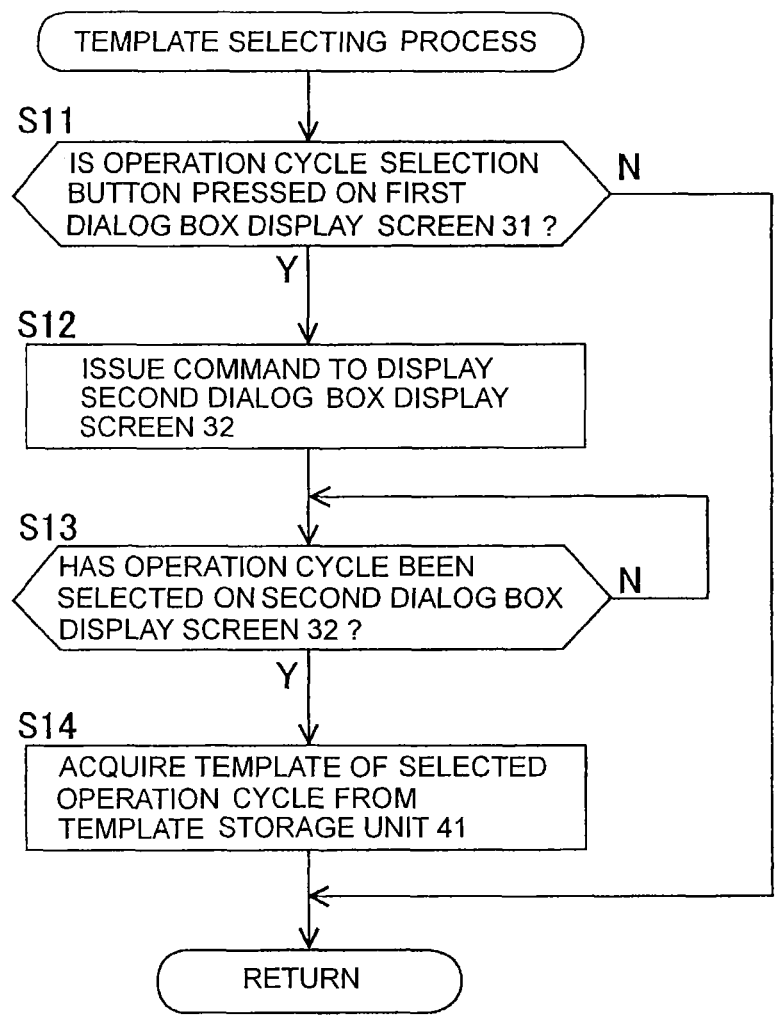
FIG. 11 is a flowchart of a process executed by a template selection processing unit shown in FIG. 8.

As shown in FIG. 11, the template selection processing unit 42 determines whether the worker operates the external input unit 70 to press the operation cycle selection button in the display area 31d on the first dialog box display screen 31 (S11). When the button is pressed, the dialog box display processing unit 45 (described later) is instructed to display the second dialog box display screen 32 (S12). Thus, the second dialog box display screen 32 shown in FIG. 5 is displayed.

Subsequently, it is determined whether the worker operates the external input unit 70 to complete selecting the operation cycle on the second dialog box display screen 32 (S13). This determination is repeatedly executed until the worker completes selection of the operation cycle. When the worker completes selection of the operation cycle on the second dialog box display screen 32, the template associated with the operation cycle is acquired from among the plurality of templates stored in the template storage unit 41 (S14). Then, the process is returned. Note that the dialog box information creation processing unit 43 creates new dialog box information on the basis of the acquired template.

The dialog box information creation processing unit 43 creates dialog box information on the basis of the template selected by the template selection processing unit 42. That is, the dialog box information creation processing unit 43 stores information regarding parameters included in the template acquired in S14 of FIG. 11, the template drawing associated with the template, and the like, in the dialog box information storage unit 44 (described later) as the dialog box information.

In addition, the dialog box information creation processing unit 43 creates dialog box information associated with the step ST of the SFC stored in the SFC storage unit 23. Here, the template selected by the template selection processing unit 42 is the template regarding the step ST of the SFC, displayed on the first dialog box display screen 31. For example, the dialog box information created on the basis of the template shown in FIG. 7 includes "ST0001" as step number.

In addition, for example, when the program storage unit 62 (described later) already stores a NC program or when a NC program is directly created, the dialog box information creation processing unit 43 creates dialog box information on the basis of the NC program. That is, the dialog box information creation processing unit 43 recognizes descriptions "Numeric Value (*$Parameter Code*Parameter Name*)" included in the NC program as parameter items, and creates dialog box information from the recognized parameter codes and parameter names and the parameter numeric values associated with the recognized parameter codes and parameter names.

Figure 12:
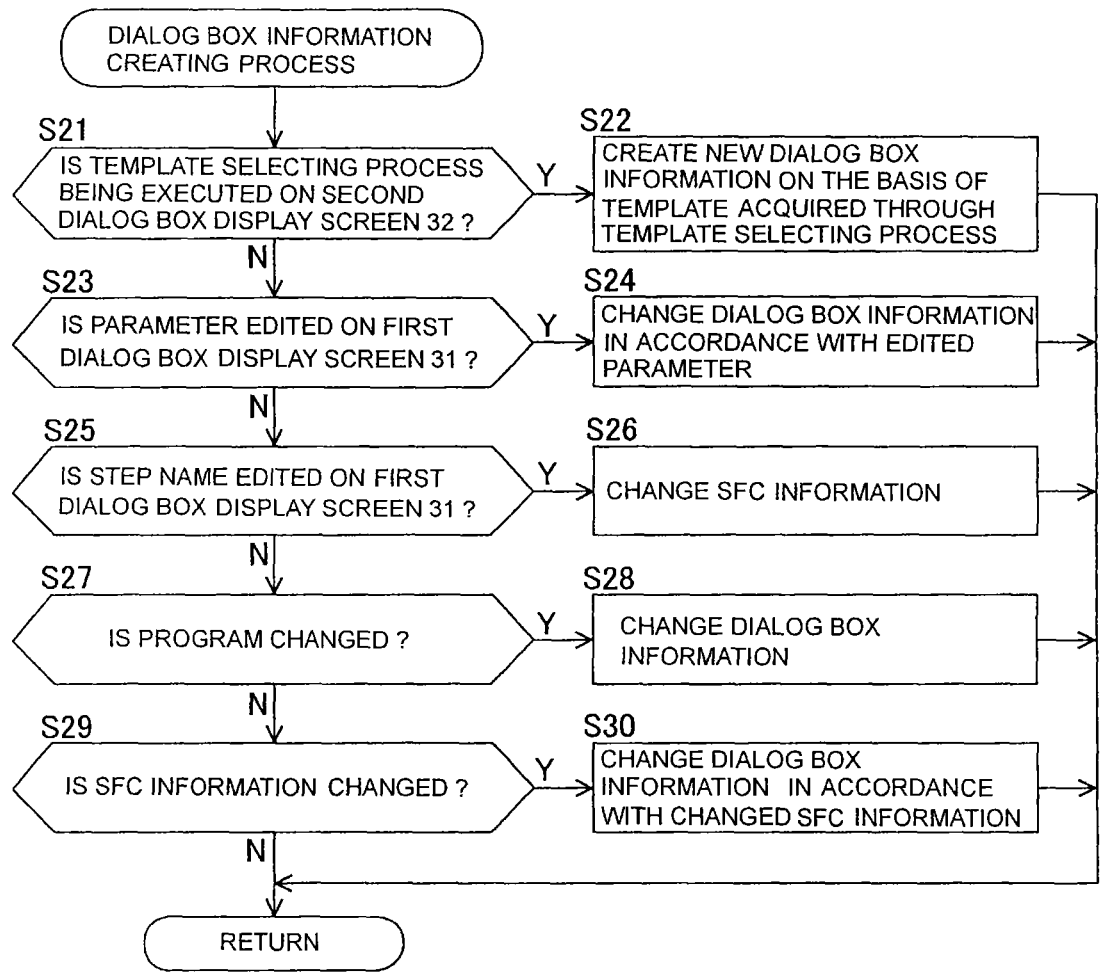
FIG. 12 is a flowchart of a process executed by a dialog box information creation processing unit shown in FIG. 8.

The process executed by the dialog box information creation processing unit 43 will be described with reference to FIG. 12. As shown in FIG. 12, the dialog box information creation processing unit 43 determines whether template selecting process is being executed on the second dialog box display screen 32 shown in FIG. 5 (S21). When selecting process is being executed, new dialog box information is created from information regarding parameters included in the template acquired in the template selecting process (S14 in FIG. 11), the template drawing associated with the template, and the like. Then, this information is stored in the dialog box information storage unit 44 (S22).

When it is determined in S21 that selecting process is not being executed, it is determined whether the worker operates the external input unit 70 to edit the parameter numeric values or parameter names in the display area 31e for the parameters on the first dialog box display screen 31 shown in FIG. 4 (S23). When the parameters are edited, the dialog box information stored in the dialog box information storage unit 44 is changed accordingly (S24).

When it is determined in S23 that the parameters are not edited, it is determined whether the worker operates the external input unit 70 to edit the step name in the display area 31b on the first dialog box display screen 31 shown in FIG. 4 (S25). When the step name is edited, the dialog box information stored in the dialog box information storage unit 44 is changed accordingly (S26).

When it is determined in S25 that the step name is not edited, it is determined whether the NC program stored in the program storage unit 62 is changed (S27). When the NC program is changed, the dialog box information stored in the dialog box information storage unit 44 is changed accordingly (S28). For example, when the parameter numeric values, parameter names, parameter codes, or the like, in the NC program shown in FIG. 6 are changed, when a non-parameterized portion is parameterized, or when a parameterized portion is non-parameterized reversely, the dialog box information regarding the corresponding parameter numeric values, parameter names and parameter codes is changed.

When it is determined in S27 that the NC program is not changed, it is determined whether the SFC stored in the SFC storage unit 23 is changed (S29). When the SFC is changed, the dialog box information stored in the dialog box information storage unit 44 is changed accordingly (S30). For example, when a step ST of the SFC shown in FIG. 3 is added, moved or deleted, the dialog box information regarding the corresponding step ST is changed. Then, after the process of S22, S24, S26, S28 or S30 or in the case of negative determination in S29, the process is returned.

The dialog box information storage unit 44 stores the dialog box information created by the dialog box information creation processing unit 43. That is, the dialog box information storage unit 44 includes parameter codes included in the NC program in addition to information regarding the areas shown in FIG. 4.

The dialog box display processing unit 45 executes a process of displaying part of the dialog box information (shown in FIG. 4), stored in the dialog box information storage unit 44, on the first dialog box display screen 31. The process executed by the dialog box display processing unit 45 will be described with reference to FIG. 13.

Figure 13:
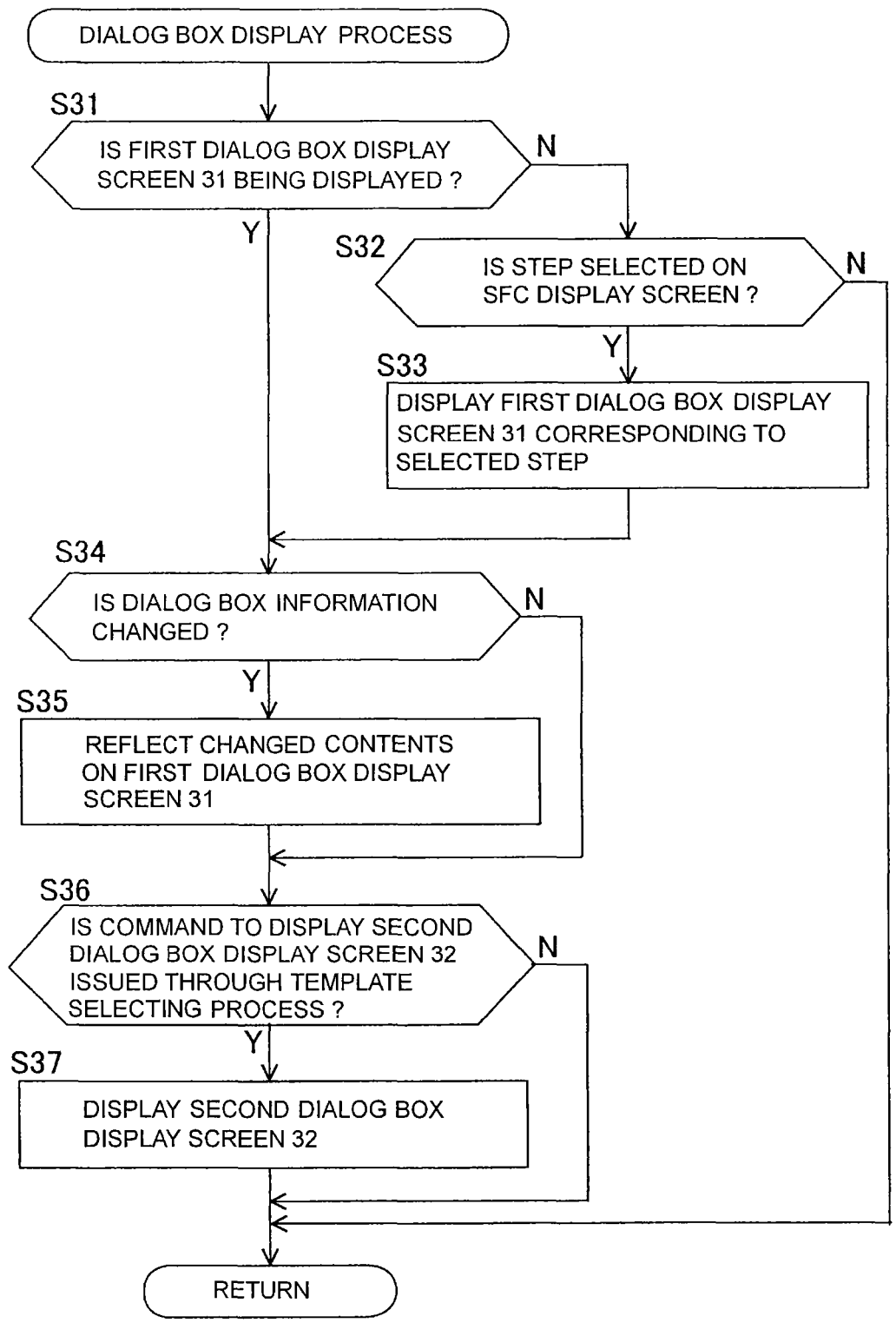
FIG. 13 is a flowchart of a process executed by a dialog box display processing unit shown in FIG. 8.

As shown in FIG. 13, the dialog box display processing unit 45 determines whether the first dialog box display screen 31 is being displayed (S31). When the first dialog box display screen 31 is not being displayed, it is determined whether the worker operates the external input unit 70 on the SFC display screen 10 to cause the SFC creation processing unit 22 to select a step ST (S32). When a step ST is selected, the first dialog box display screen 31 for the step ST is displayed (S33).

In addition, when the first dialog box display screen 31 is being displayed in S31, it is determined whether the dialog box information is changed (S34). When the dialog box information is changed, the change is reflected on the first dialog box display screen 31 (S35). For example, when the dialog box information is changed through a change of the dialog box information as a result of completion of selection of a template, a change of the SFC in the SFC storage unit 23 by the SFC creation processing unit 22, a change of the parameter numeric values, codes or names of the NC program, or the like, the above process is executed. On the other hand, when the dialog box information is not changed in S34, the process of S35 is not executed.

Subsequently, it is determined whether a command to display the second dialog box display screen 32 is issued through template selecting process (S36). That is, it is determined whether the worker operates the external input unit 70 to press the operation cycle selection button in the display area 31d on the first dialog box display screen 31. When the display command is issued, the process of displaying the second dialog box display screen 32 is executed (S37). On the other hand, when the display command is not issued in S36 or when a step ST is not selected in S32, the process is returned.

The NC program will be described below. As shown in FIG. 6, the program display screen 50 is a screen for displaying the NC program. The entire NC program may be displayed on the program display screen 50 or each operation cycle of the NC program may be displayed on the program display screen 50. As shown in FIG. 6, the NC program includes the step start code "(*$CYC0001*Normal*)", the step end code "(*$CYCEND*)" and the parameterized statements "Numeric Value (*$Parameter Code*Parameter Name*)". There are 12 types of parameterized statements (12 items shown in the display area 31e of FIG. 4). In addition, the parameter code that has been once parameterized is described as "Numeric Value (*$Parameter Code*)", and the parameter name may be omitted. For example, "250 (*$C112*)" at the fifth line from the bottom corresponds to this case.

As shown in FIG. 8, the program processing unit 60 includes a program creation processing unit 61, the program storage unit 62 and a program display processing unit 63. The program creation processing unit 61 automatically creates a NC program on the basis of the SFC stored in the SFC storage unit 23 and the pieces of dialog box information, stored in the dialog box information storage unit 44. That is, a newly created NC program is formed by combining the templates of the operation cycles respectively associated with the steps ST of the SFC together in the sequence of the steps ST.

Furthermore, when parameter numeric values in the dialog box information stored in the dialog box information storage unit 44 are updated, the program creation processing unit 61 executes a process of changing the corresponding parameter numeric values in the NC program stored in the program storage unit 62 to the updated parameter numeric values. In addition, the same applies to the case where parameter names in the dialog box information are updated. That is, the NC program that is created from the templates directly at the beginning becomes a NC program that reflects edited information by editing the parameter numeric values and the parameter names on the first dialog box display screen 31.

The program storage unit 62 stores the NC program created by the program creation processing unit 61. The program display processing unit 63 executes a process of displaying the NC program stored in the program storage unit 62 on the program display screen 50. Therefore, when the NC program stored in the program storage unit 62 is changed, the contents displayed on the program display screen 50 are also changed accordingly.

Figure 14:
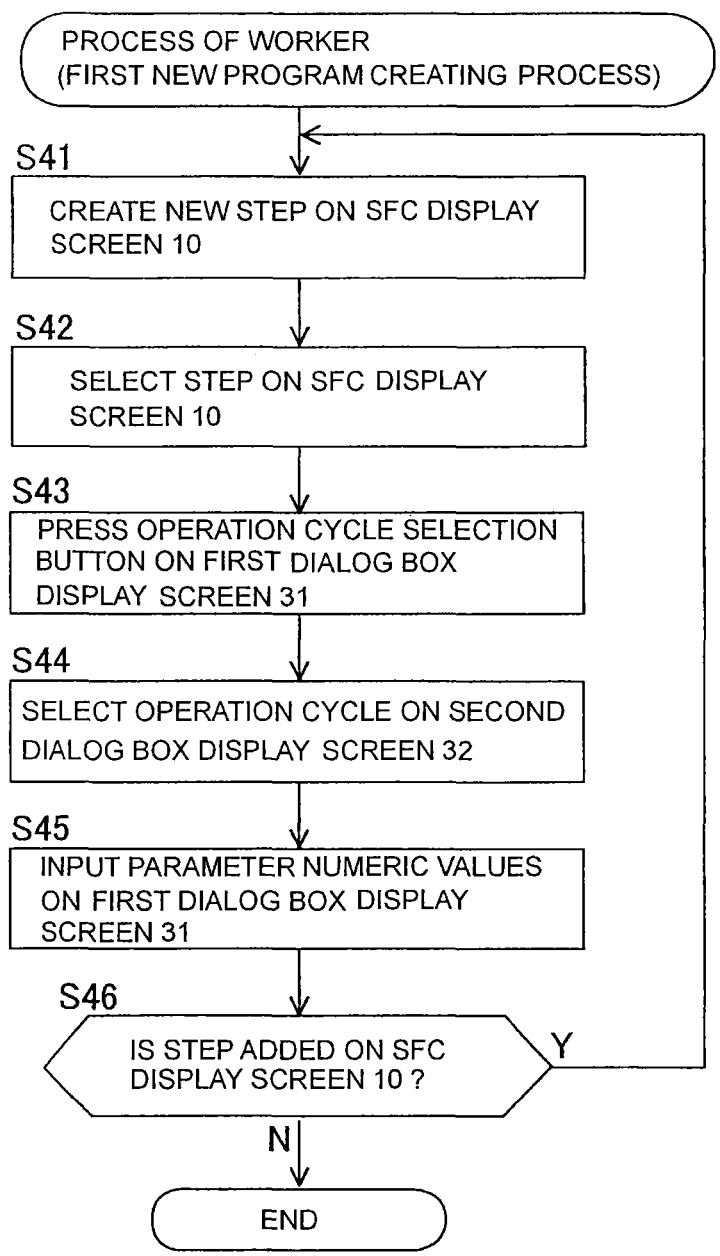
FIG. 14 is a flowchart of a process in which a new program is created by a worker.

The process of creating a new NC program will be described with reference to the above-described program creating device. Hereinafter, two types of creating processes will be described. The first creating process will be described with reference to FIG. 14. The process shown in FIG. 14 is executed as the worker operates the external input unit 70.

Initially, the worker creates a new step ST on the SFC display screen 10 (S41). This process is executed by the SFC creation processing unit 22. Subsequently, the worker selects the newly created step ST on the SFC display screen 10 (S42). Then, through S9 and S10 of FIG. 9 and S32 and S33 of FIG. 13, the first dialog box display screen 31 shown in FIG. 4 is displayed.

Subsequently, the worker presses the operation cycle selection button in the display area 31d on the first dialog box display screen 31 (S43). Then, through S11 and S12 of FIG. 11 and S36 and S37 of FIG. 13, the second dialog box display screen 32 shown in FIG. 5 is displayed. Subsequently, the worker selects an operation cycle on the second dialog box display screen 32 (S44). Then, the dialog box information is created through S21 and S22 of FIG. 12, and is reflected on the first dialog box display screen 31 through S34 and S35 of FIG. 13. The parameter numeric values displayed on the first dialog box display screen 31 at this time are initial values described in the template. Furthermore, a NC program that uses the templates directly is created by the program creation processing unit 61.

Subsequently, the worker edits the parameter numeric values on the first dialog box display screen 31 (S45). Then, the dialog box information is changed through S23 and S24 of FIG. 12, and is reflected on the display of the first dialog box display screen 31 through S34 and S35 of FIG. 13. Furthermore, the parameter numeric values of the NC program are changed to the edited parameter numeric values by the program creation processing unit 61. That is, the NC program in which the edited parameter numeric values are described is created as shown in FIG. 6. Subsequently, when a new step ST is added on the SFC display screen 10, the process returns to S41 again and is repeated (S46). On the other hand, when no new step ST is added, the process of creating the NC program ends.

Figure 15:
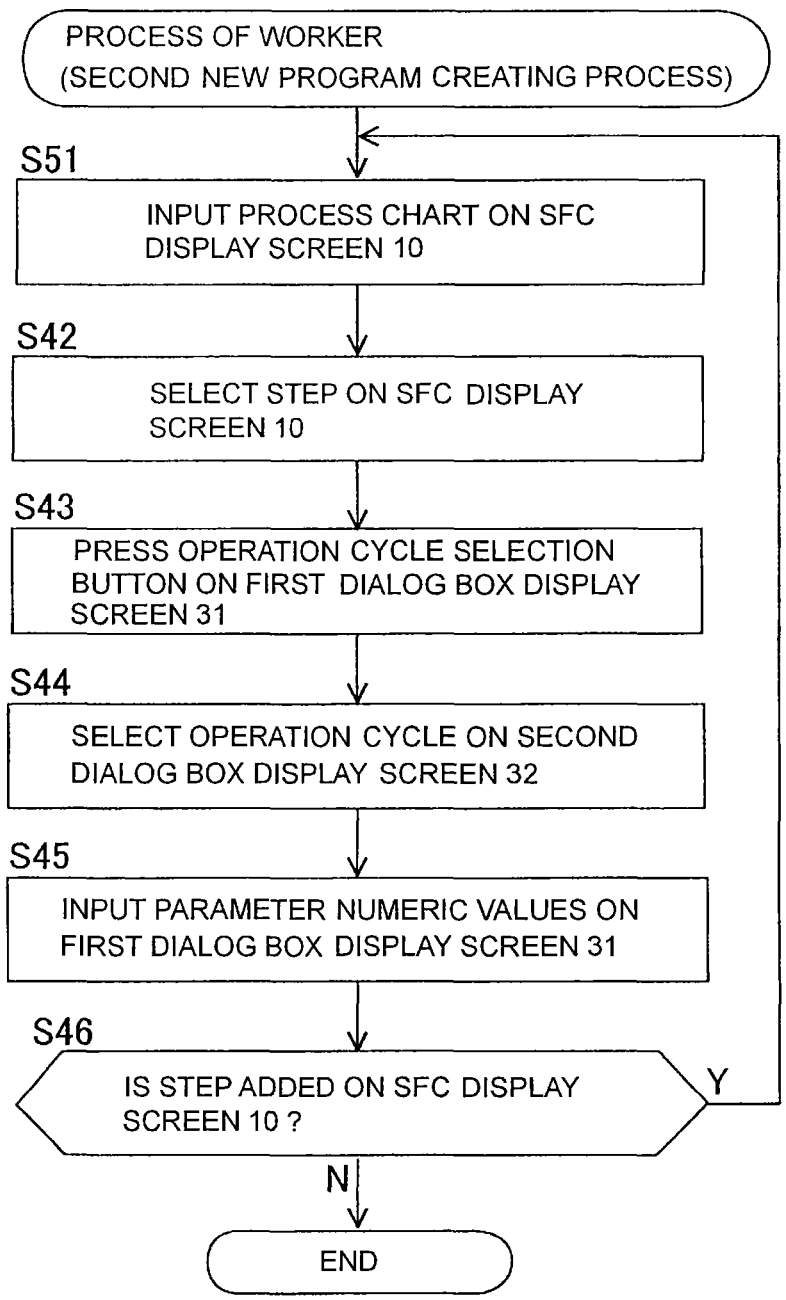
FIG. 15 is a flowchart of a process in which a new program is created by a worker.

Next, the second process of creating a new NC program will be described with reference to FIG. 15. The process shown in FIG. 15 is executed as the worker operates the external input unit 70. Here, in FIG. 15, the same reference signs as those of FIG. 14 indicate the same steps, and the detailed description thereof is omitted.

Initially, as shown in FIG. 15, the worker inputs a process chart on the SFC display screen 10 (S51). This process is executed by the process chart input unit 21 shown in FIG. 8. Then, a SFC based on the process chart is automatically created through S1 and S2 of FIG. 9. Subsequently, the process of S42, S43, S44, S45 and S46 are executed sequentially. Then, when a new step ST is added on the SFC display screen 10 in S46, the process is returned to S51 again and is repeated (S46).

Advantageous effects will be described below. The contents of the first dialog box display screen 31 correspond to the parameter numeric values and parameter names described in the NC program. That is, by describing the parameter codes and the parameter names in the NC program, the parameter names are set as editable items on the first dialog box display screen 31. Thus, the numeric values described in the NC program may be freely parameterized.

Furthermore, parameterizing means just simply needs to describe "Numeric Value (*$Parameter Code*Parameter Name*)" in the NC program. Thus, parameterization is significantly easy. Because the numeric values are freely parameterized in this way, numeric values that need to be described multiple times in the NC program are easily parameterized, so work for editing parameter numeric values is also easy. As a result, it is possible to reduce erroneous input or erroneous setting of numeric values in the NC program. Particularly, for example, when some of numeric values are changed due to a design change, a period of time required to change the NC program is reduced. Furthermore, when a NC program is once created, the NC program is edited without understanding of a special G code, or the like.

In addition, on the first dialog box display screen 31, not only parameter numeric values but also parameter names are editable. Then, a change of the parameter name on the first dialog box display screen 31 is reflected on the NC program. Thus, for example, when the parameter name is desired to be changed to an easily understandable name, editing on the first dialog box display screen 31 is possible without directly editing the NC program. Thus, it is possible to further increase the flexibility of editing made by the worker.

In addition, a NC program is created from the templates stored in the template storage unit 41 in advance. Thus, it is possible to standardize the NC program. For example, a NC program is created from one template or a combination of a plurality of templates, and parameter numeric values included in the NC program are input on the first dialog box display screen 31 as described above. Here, the templates themselves are in a high degree of completion with less number of errors, or the like, in advance. Therefore, it is possible to reduce a debug time for a NC program created using the templates. Furthermore, because a NC program is created from templates, even when a special G code, or the like, included in the NC program is not understood, the NC program is created.

Furthermore, a NC program is recognized as a SFC. Thus, the NC program is displayed as the SFC, and the NC program is created from the SFC. Generally, a NC program is created using significantly difficult codes, so only an expert is able to easily understand the NC program at sight. However, because a NC program is displayed as a SFC, the steps of the NC program are visually understood. Furthermore, a NC program is created on the basis of a SFC, and the SFC is created on the basis of the step start codes "(*$CYC0001*Normal*)" and step end codes "(*SCYCEND*)" of the NC program. That is, the SFC is associated with the NC program. Thus, the NC program is visually created and edited.

Furthermore, the pieces of dialog box information, stored in the dialog box information storage unit 44, are associated with the steps ST of the SFC. Thus, a SFC is created, and then parameter numeric values are input on the first dialog box display screen 31. Thus, it is possible to create a NC program. That is, even when special G codes included in the NC program are not understood, the NC program formed of a plurality of operation cycles is easily created.

In addition, when a process chart is created in advance, a SFC is created from the process chart. Thus, creating a NC program becomes easier. Furthermore, the step names of the SFC are displayed on the SFC display screen 10 to thereby make it possible to easily understand the processes executed in the steps ST of the SFC. As a result, it becomes easy to create a NC program with the use of a SFC.

In addition, because the drawing (for example, a template drawing, the drawing of a workpiece, or the like) that shows an operation type is displayed on the first dialog box display screen 31, it is possible to visually understand what is editable on the currently displayed first dialog box display screen 31. Thus, it is possible to easily create a NC program. Then, the drawing displayed on the first dialog box display screen 31 is set as a template drawing. Thus, a drawing does not need to be input individually and the drawing is associated with a template, so it is possible to prevent an erroneously set drawing from being displayed.

In addition, in the above embodiment, creating a NC program for a machine tool is illustrated as an example. Other than this, the invention may be applied to a program that controls a positioning device for mobile units, such as another machining robot and another measuring device. Particularly, a NC program for a machine tool and a program for a machining robot especially require the knowledge of an expert. Therefore, application of the program creating device according to the invention to the NC program for a machine tool and the program for a machining robot is significantly useful.

What is claimed is:

1. A machine control program creating device for creating a numerical control program for controlling a machine, comprising:
   a program storage device configured to store a machine control program that includes, for a machining operation to be performed at a certain location on a workpiece, a numeric value, a code, and a name, that are associated with the machining operation;
   dialog box information creation processing circuitry configured to access the machine control program stored in the program storage device, recognize at least two instances of predetermined characters included in the machine control program as each indicating a different parameter item, create dialog box information including a first parameter code, a first parameter name, and a first parameter numeric value associated with the first instance of the predetermined characters in the machine control program and a second parameter code, a second parameter name, and a second parameter numeric value associated with the second instance of the predetermined characters in the machine control program, the predetermined characters being the same for the different parameter items;
   a dialog box information storage device configured to store the dialog box information created by the dialog box information creation processing circuitry;
   a display configured to display a dialog box display screen that is an input screen for editing the parameter items;
   dialog box display processing circuitry configured to cause the dialog box display screen to display the first parameter name and the first parameter numeric value stored in the dialog box information storage device;
   an external input device configured to edit the first parameter numeric value on the dialog box display screen based upon an operation by a user, the dialog box information creation processing circuitry configured to update the first parameter numeric value stored as the dialog box information in the dialog box information storage device when the first parameter numeric value is edited; and
   program creation processing circuitry configured to, when the first parameter numeric value within the dialog box information stored in the dialog box information storage device is updated, execute a process of changing a corresponding numeric value in the machine control program stored in the program storage device to the updated numeric value, wherein:
   the external input device is configured to edit the first parameter name on the dialog box display screen based upon an operation by the user, the dialog box information creation processing circuitry configured to replace the first parameter name stored as the dialog box information in the dialog box information storage device when the first parameter name is edited;
   when the first parameter name within the dialog box information stored in the dialog box information storage device is replaced, the program creation processing circuitry is configured to execute a process of changing a corresponding name in the machine control program stored in the program storage device to the updated name;
   the dialog box display processing circuitry is configured to change the dialog box information including the first parameter code, the first parameter name, and the first parameter numeric value when corresponding first code, first name, and first numeric value in the machine control program are changed;
   the dialog box display processing circuitry is configured to change the dialog box information including adding a third parameter code, a third parameter name, and a third parameter numeric value when corresponding third code, third name, and third numeric value in the machine control program are parameterized by addition of a third instance of the predetermined characters in the machine control program as recognized by the dialog box information creation processing circuitry; and
   the dialog box display processing circuitry is configured to change the dialog box information including removing the second parameter code, the second parameter name, and the second parameter numeric value when corresponding second code, second name, and second numeric values in the machine control program are de-parameterized by removal of the second instance of the predetermined characters from the machine control program as recognized by the dialog box information creation processing circuitry.

2. The machine control program creating device according to claim 1, further comprising:
a template storage device configured to store a plurality of templates of the machine control program, each template corresponding to an operation type to be performed on the workpiece; and
template selection processing circuitry configured to select at least one template from among the plurality of the templates, wherein
the dialog box information creation processing circuitry is configured to create the dialog box information based on the at least one template selected by the template selection processing circuitry, and
the program creation processing circuitry is configured to create the machine control program based on the dialog box information stored in the dialog box information storage device.

3. The machine control program creating device according to claim 1, further comprising:
SFC creation processing circuitry configured to, when the machine control program is divided into a plurality of operation cycles, create steps of a sequential function chart corresponding to the respective operation cycles;
a SFC storage device configured to store the sequential function chart created by the SFC creation processing circuitry; and
SFC display processing circuitry configured to cause the sequential function chart stored in the SFC storage device to be displayed on the display, wherein
the dialog box information creation processing circuitry is configured to create pieces of the dialog box information respectively associated with the steps of the sequential function chart stored in the SFC storage device,
the program creation processing circuitry is configured to create the machine control program based on the sequential function chart stored in the SFC storage device and the pieces of the dialog box information stored in the dialog box information storage device, and
the SFC creation processing circuitry is configured to create the sequential function chart based on step start codes and step end codes of the machine control program stored in the machine control program storage device.

4. The machine control program creating device according to claim 3, further comprising:
a process chart input device configured to receive a process chart showing control steps of the machine and showing a sequence of a plurality of processes, wherein
the SFC creation processing circuitry is configured to recognize the respective control steps of the process chart input by the process chart input device as the respective operation cycles of the machine control program, and create the steps for each of the control steps.

5. The machine control program creating device according to claim 3, wherein:
the SFC storage device is configured to store a step name for each step in addition to the sequential function chart; and
the SFC display processing circuitry causes the display to display the step name for each step in addition to the sequential function chart.

6. The machine control program creating device according to claim 1, wherein:
the dialog box information includes a drawing that shows an operation type; and
the drawing that shows the operation type is displayed on the dialog box display screen.

7. The machine control program creating device according to claim 2, wherein:
the template storage device is configured to store template drawings that respectively show operation types corresponding to the plurality of templates;
the dialog box information includes the template drawings; and
one of the template drawings is displayed on the dialog box display screen.

8. The machine control program creating device according to claim 1, wherein the machine control program is a machining program for controlling a machine tool that machines a workpiece.

9. The machine control program creating device according to claim 2, further comprising:
SFC creation processing circuitry configured to, when the machine control program is divided into a plurality of operation cycles, create steps of a sequential function chart corresponding to the respective operation cycles;
a SFC storage device for configured to store the sequential function chart created by the SFC creation processing circuitry; and
SFC display processing circuitry configured to cause the sequential function chart stored in the SFC storage device to be displayed on the display, wherein
the dialog box information creation processing circuitry is configured to create pieces of the dialog box information respectively associated with the steps of the sequential function chart stored in the SFC storage device,
the program creation processing circuitry is configured to create the machine control program based on the sequential function chart stored in the SFC storage device and the pieces of dialog box information stored in the dialog box information storage device, and
the SFC creation processing circuitry is configured to create the sequential function chart based on step start codes and step end codes of the machine control program stored in the machine control program storage device.

10. The machine control program creating device according to claim 1, wherein each of the first code, second code, and third code include a character string, which is different from prescript words for a numerical control code.

11. The machine control program creating device according to claim 1, wherein each of the first name, second name, and third name include a character string, which is different from prescript words for a numerical control code, representing a meaning of a corresponding parameter.

12. The machine control program creating device according to claim 1, wherein the corresponding third code, third name, and third numeric value in the machine control program are parameterized when the predetermined characters are added to the machine control program in proximity to the corresponding third code, third name, and third numeric value in the machine control program.

13. The machine control program creating device according to claim 1, wherein the corresponding second code, second name, and second numeric in the machine control program are de-parameterized when the predetermined characters are removed from the machine control program in proximity to the corresponding second code, second name, and second numeric value in the machine control program.

14. The machine control program creating device according to claim 12, wherein the corresponding second code, second name, and second numeric value in the machine control program are de-parameterized when the predetermined characters are removed from the machine control program in proximity to the corresponding second code, second name, and second numeric value in the machine control program.

15. The machine control program creating device according to claim 1, wherein the predetermined characters include at least two different punctuation marks.

16. The machine control program creating device according to claim 15, wherein the machine control program includes a character string corresponding to the first numeric value followed by one of the at least two different punctuation marks followed by a character string corresponding to the first code followed by one of the at least two different punctuation marks followed by a character string corresponding to the first name followed by one of the at least two different punctuation marks.

17. The machine control program creating device according to claim 1, wherein the predetermined characters include at least two of an asterisk, a dollar sign, an open parenthesis, and a close parenthesis.

18. The machine control program creating device according to claim 17, wherein the predetermined characters include three asterisks, a dollar sign, an open parenthesis, and a close parenthesis.

19. The machine control program creating device according to claim 1, wherein the machine control program includes a character string corresponding to the first numeric value followed by at least one of an asterisk, a dollar sign, an open parenthesis, and a close parenthesis followed by a character string corresponding to the first code followed by at least one of the asterisk, the dollar sign, the open parenthesis, and the close parenthesis followed by a character string corresponding to the first name followed by at least one of the asterisk, the dollar sign, the open parenthesis, and the close parenthesis.

20. The machine control program creating device according to claim 1, wherein the machine control program includes a character string corresponding to the first numeric value followed by three of an asterisk, a dollar sign, an open parenthesis, and a close parenthesis followed by a character string corresponding to the first code followed by one of the asterisk, the dollar sign, the open parenthesis, and the close parenthesis followed by a character string corresponding to the first name followed by one of the asterisk, the dollar sign, the open parenthesis, and the close parenthesis.

* * * * *